United States Patent
Ehrhart et al.

(10) Patent No.: US 6,675,563 B1
(45) Date of Patent: Jan. 13, 2004

(54) DISC CUTTERBAR SHEAR PROTECTION

(75) Inventors: Philip J. Ehrhart, Narvon, PA (US); Charles H. Hoffman, New Holland, PA (US); Kenneth W. McLean, New Holland, PA (US); David A. Hess, Davis, CA (US)

(73) Assignee: New Holland North America, Inc, New Holland, PA (US)

( * ) Notice: Subject to any disclaimer, the term of this patent is extended or adjusted under 35 U.S.C. 154(b) by 0 days.

(21) Appl. No.: 10/223,563

(22) Filed: Aug. 19, 2002

(51) Int. Cl.[7] .................................................. A01D 75/18
(52) U.S. Cl. ........................................... 56/10.3; 56/6
(58) Field of Search ............................. 56/6, 10.3, 11.3, 56/10.2 R, 10.2 E, 10.8, 12.7, 13.5, 13.6, 157, 255, 269, 295, DIG. 6; 192/148, 233, 56, 55, 18 R; 464/30, 32

(56) References Cited

U.S. PATENT DOCUMENTS

| 2,056,785 A | 10/1936 | Hanna .......................... 64/28 |
| 3,064,454 A | 11/1962 | Sharples ....................... 64/28 |
| 3,521,464 A | 7/1970 | Kidby ............................ 64/11 |
| 4,497,161 A | 2/1985 | Vissers et al. ................ 56/13.6 |
| 4,815,262 A | 3/1989 | Koch et al. ................... 56/13.6 |
| 4,833,868 A | * 5/1989 | Ermacora et al. ............ 56/13.6 |
| 4,955,187 A | * 9/1990 | van der Lely ............... 56/13.6 |
| 4,986,060 A | * 1/1991 | Walters et al. .................... 56/6 |
| 4,999,981 A | 3/1991 | Neuerburg ....................... 56/6 |
| 5,111,644 A | * 5/1992 | van der Lely ............... 56/13.6 |
| 5,715,662 A | 2/1998 | Walters ............................ 56/6 |
| 5,761,890 A | 6/1998 | Lehman et al. .................. 56/6 |
| 6,487,835 B2 | * 12/2002 | Kraus et al. ..................... 56/6 |
| 6,502,377 B2 | * 1/2003 | Kraus .............................. 56/6 |
| 6,604,347 B2 | * 8/2003 | Preipke et al. .................. 56/6 |

* cited by examiner

Primary Examiner—Árpád F Kovács
(74) Attorney, Agent, or Firm—John William Stader; Collin A. Webb; Brant T. Maurer

(57) ABSTRACT

A disc cutterbar having a two-piece mounting hub, one piece rotatably driven and the other supporting a knife for severing standing crop material, with spring-mounted ball and detent devices holding the two pieces members together and forming a shear device therebetween is disclosed. A specially threaded retaining bolt is associated with the knife-supporting piece whereby, upon failure of the shear device, the knife-supporting piece is rotated out of the cutting plane and away from the operational cutterheads.

16 Claims, 4 Drawing Sheets

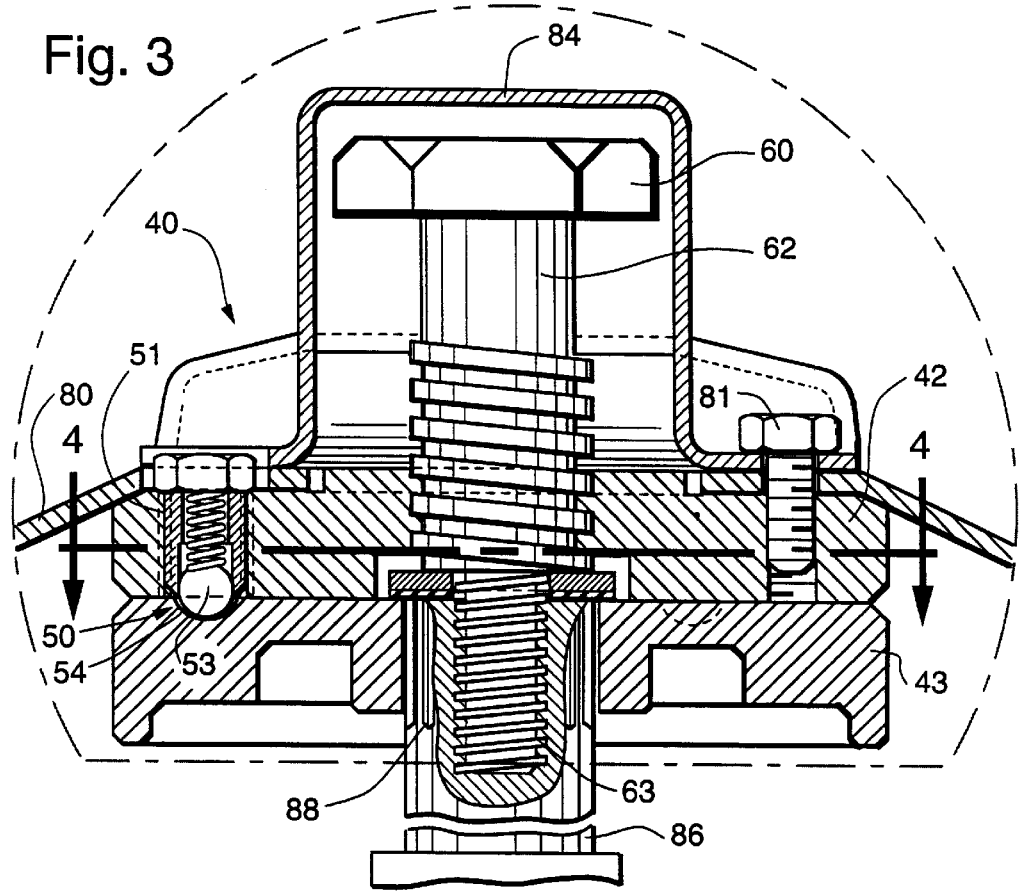
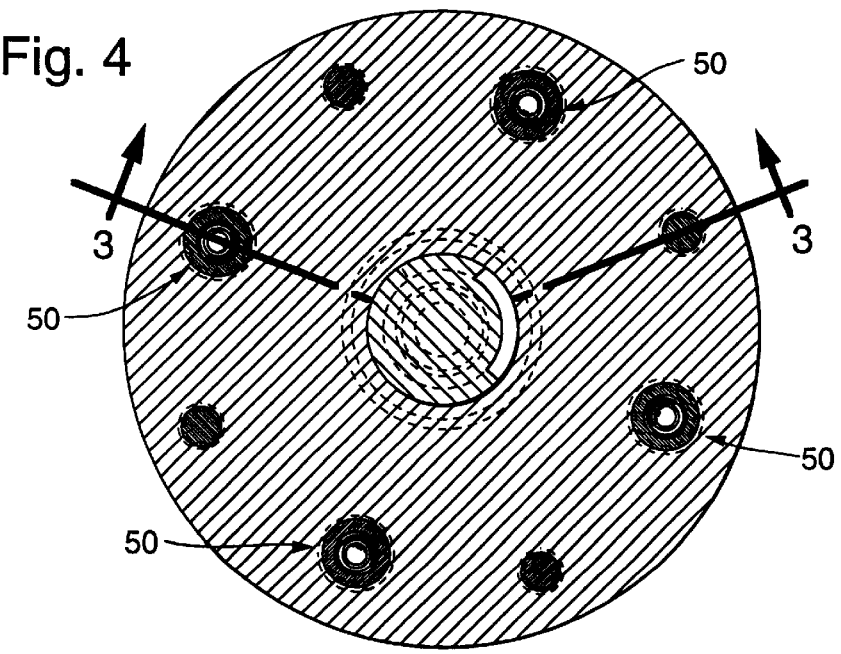

DISC CUTTERBAR SHEAR PROTECTION

FIELD OF THE INVENTION

The present invention relates generally to mechanisms for protecting mechanical drive components from overloads, and more particularly relates to a shear device coupled between components of an agricultural disc mower that protects the various components of the mower in the event a cutterhead strikes an object and creates an overload condition.

BACKGROUND OF THE INVENTION

Typical disc cutterbars used in agriculture include an elongated housing containing a train of meshed idler and drive spur gears, or a main power shaft coupled by respective bevel gear sets, for delivering power to respective drive shafts for cutterheads spaced along the length of the cutterbar. The cutterheads each comprise a cutting disc including diametrically opposed cutting blades (though configurations with three or more blades are known) and having a hub coupled to an upper end of a drive shaft, the lower end of the drive shaft carrying a spur gear in the case where a train of meshed spur gears is used for delivering power, and carrying a bevel gear of a given one of the bevel gear sets in the case where a main power shaft is used. In either case, bearings are used to support the various shafts. The cutterheads are rotated at a relatively fast speed making the drive components, such as gears, bearings and shafts, vulnerable to damage in the event that the unit strikes a foreign object. For background information on the structure and operation of some typical disc cutterbars, reference is made to U.S. Pat. No. 4,815,262, issued to E. E. Koch and F. F. Voler, the descriptive portions thereof being incorporated herein in full by reference.

In order to minimize the extent of such possible damage to the drive components, it is known to incorporate a shear device somewhere in the drive of each unit that will "fail" upon a predetermined overload being imposed on the device. As used herein with reference to shear devices, the terms "fail" or "failing" are intended to cover the actual function of such devices, i.e., shearing, fracturing, breaking and the like. Several different such shear devices and arrangements are shown in U.S. Pat. Nos. 4,999,981, 4,497,161 and 5,715,662.

The '981 patent shows a shear mechanism that comprises a shaft with a weakened portion created by a cut groove, or break zone 41 (seen, for example, in FIG. 3 thereof) in driven shaft 20. Upon overload, the shaft breaks at zone 41 that is located outside the support bearing such that there is a clean and complete break in the shaft. This structure is intended to eliminate the input of kinetic energy to the cutterhead after failure of the shear mechanism, thereby eliminating damage to the drive system and gearing. While this structure may in fact eliminate the input of further kinetic energy, it does not stop rotation of the cutterhead or prevent the damage that continued rotation would generate.

A somewhat different shear mechanism is disclosed in FIGS. 2 and 3 of the '161 patent. Cutting disc 3 is connected by a series of shear bolts 26 to the vertical shaft 8. Upon impact of the cutterhead with an obstruction, the shear bolts fail, stopping the input of rotational force to the cutterhead. FIG. 4 shows a slightly different embodiment where a resilient cover plate 28 depresses balls 30 arranged in holes of the disc 3 and fitting into recesses 31 of the disc 27. An overload impact is intended to cause balls 30 to snap out of the recesses 31 so that the direct rotary joint between shaft 8 and cutting disc 3 is interrupted. It is stated that the connection can be reestablished by continuing to rotate disc 3 with respect to the disc 27 so that the balls 30 again snap into the recesses 31. The embodiments set forth in this patent exhibit the same shortcomings as seen in the '981 patent, i.e., standard shear mechanisms do not stop rotation of the cutterhead, and thus do not prevent additional damage thereby encountered.

The shear mechanisms shown in the '662 patent each employ shearable splines. In a first embodiment the shear device is in the form of either a collar or clamping member having internal splines received on a splined upper end of the drive shaft and having shearable cylindrical drive lugs engaged with complementary shaped openings provided in an upper surface of a disk hub. Referring more specifically to FIG. 2 thereof, the upper end of drive shaft 26 has a splined section 86. Shear collar 88 establishes a drive connection between shaft 26 and hub 80. The collar 88 includes internal splines 90 engaged with the splined section 86 of shaft 26 just above hub 80. Shearable cylindrical drive lugs 92 project downwardly from the bottom of collar 88 and are received in complementary holes 94 in hub 80. An overload situation causes the lugs 92 to shear and the continuing transfer of rotational power to cease. FIGS. 4 through 6 show another embodiment where shaft 34 has a splined upper end section 110. Instead of a shear collar, a shear device in the form of a cap-like clamping member 114 is used for transferring torque from shaft 34 to hub 80. Clamping member 114 has an annular lower portion 116 provided with interior splines 118 engaged with the splined section 110 of shaft 34. A plurality of shearable lugs 120 extend downwardly from lower portion 116 and are received in complementary shaped cylindrical openings 94 in hub 80, whereby torque is transferred from shaft 34 to hub 80. Again, when an overload occurs, lugs 120 shear, and torque is no longer transmitted. The final embodiment shown in the '662 patent is shown in FIGS. 7 through 9. Instead of a disk hub 80, a disk hub 127 is used which has a central splined opening 128 disposed in spaced concentric relationship t the splined upper end section 110 of shaft 34. A ring-like shear insert 130 is received on the upper end of the drive shaft 34 and has inner splines 132 engaged with the splined upper end section of the shaft and has outer splines 134 engaged with the splined opening 128 of hub 126. Splines 132 are designed to shear upon overload.

Similar to the devices discussed above, the embodiments of the '662 patent do not stop the cutterhead from rotating, even after power is cut off by a shear device. The third embodiment shown in this patent exhibits an additional shortcoming in that upon failure of the shearable splines, the broken pieces tend to become temporarily "jammed" in among the other parts and components, resulting in even further, though short lived, torque to be transferred, and the resultant additional damage to the cutterheads.

Particularly in its preferred embodiment, the instant invention overcomes the drawbacks and shortcomings of the prior art. A two-piece hub design, with a spring mounted ball and detent as a shear mechanism therebetween will fail with substantially no residual transfer of torque. The use of this unique shear mechanism results in no broken pieces to become "jammed" in among the other parts and components, and can be easily repaired by simply realigning the top and bottom hubs so that the spring-loaded ball in the top disc hub fits into the detent in the lower disc hub. Upon failure, the two-piece hub, one of which is driven directly by the drive shaft, separates and the upper disc hub is driven up a specially threaded retaining bolt and separates from the lower hub and drive shaft. This upward movement separates the upper disc hub from the drive train and removes the affected cutting implement from the path of the other cutterheads on the cutterbar. The upper disc hub continues to rotate upward until it reaches a threadless portion of the retaining bolt. There, the upper disc hub is permitted to rotate freely until the absence of drive train inertia causes it to stop.

Clearly, the concept of a shear mechanism is not new, however the use of a spring-mounted ball and detent instead of a pin, lug, or bolt, as well as the utilization of a specially threaded retaining bolt, provides advantages in overcoming the problems and shortcomings of the prior art as discussed above. In order to limit the damage to a cutterbar in an overload situation, two characteristics are pursued—a quick, clean disengagement of the driven elements, and the prevention of damage to adjacent discs on the cutterbar by rapid removal of the affected disc from the cutting plane. For non-traditional shear mechanisms, attention is directed to U.S. Pat. No. 2,056,785 (rubber), U.S. Pat. No. 3,064,454 (solder, glass, and other fracturable and fusible materials), and U.S. Pat. No. 3,521,464 (plastic).

SUMMARY OF THE INVENTION

Accordingly, one object of the present invention is to provide a specially threaded retaining bolt, operating in conjunction with a shear mechanism, in a mechanical drive train for an agricultural cutterbar that will not only stop the transfer of power along the drive train in the event of overload, but also remove the affected disc hub from the path of other cutterheads on the cutterbar.

It is another object of the present invention is to provide a novel shear device between hub components of a cutterhead.

It is a further object of the present invention is to provide a disc cutterbar with multiple cutterheads, each comprising a drive shaft connected to an inner hub which is connected to an outer hub via a shear mechanism. Upon failure of the shear mechanism, the upper hub and blades are rotated to a position above the cutting plane and out of the path of other cutterheads on the cutterbar.

It is yet a further object of this invention to provide an improved disc cutterbar that is relatively durable in construction, inexpensive of manufacture, carefree of maintenance, easy to assemble, simple and effective in use, and less likely than prior art cutterbars to sustain costly damage upon contact with a fixed object.

These and other objects, features and advantages are accomplished according to the instant invention by providing a disc cutterbar having a two-piece mounting hub, one piece rotatably driven and the other supporting a knife for severing standing crop material, with spring-mounted ball and detent devices holding the two pieces members together and forming a shear device therebetween. A specially threaded retaining bolt is associated with the knife-supporting piece whereby, upon failure of said shear device, the knife-supporting piece is rotated out of the cutting plane and away from the operational cutterheads.

BRIEF DESCRIPTION OF THE DRAWINGS

The advantages of this invention will be apparent upon consideration of the following detailed disclosure of the invention, especially when taken in conjunction with the accompanying drawings wherein:

FIG. 3 is an enlarged view of a portion of FIG. 2;

FIG. 4 is a top plan view of the lower locking block taken along line 3—3 of FIG. 3;

DETAILED DESCRIPTION OF THE PREFERRED EMBODIMENT

Figure 1:
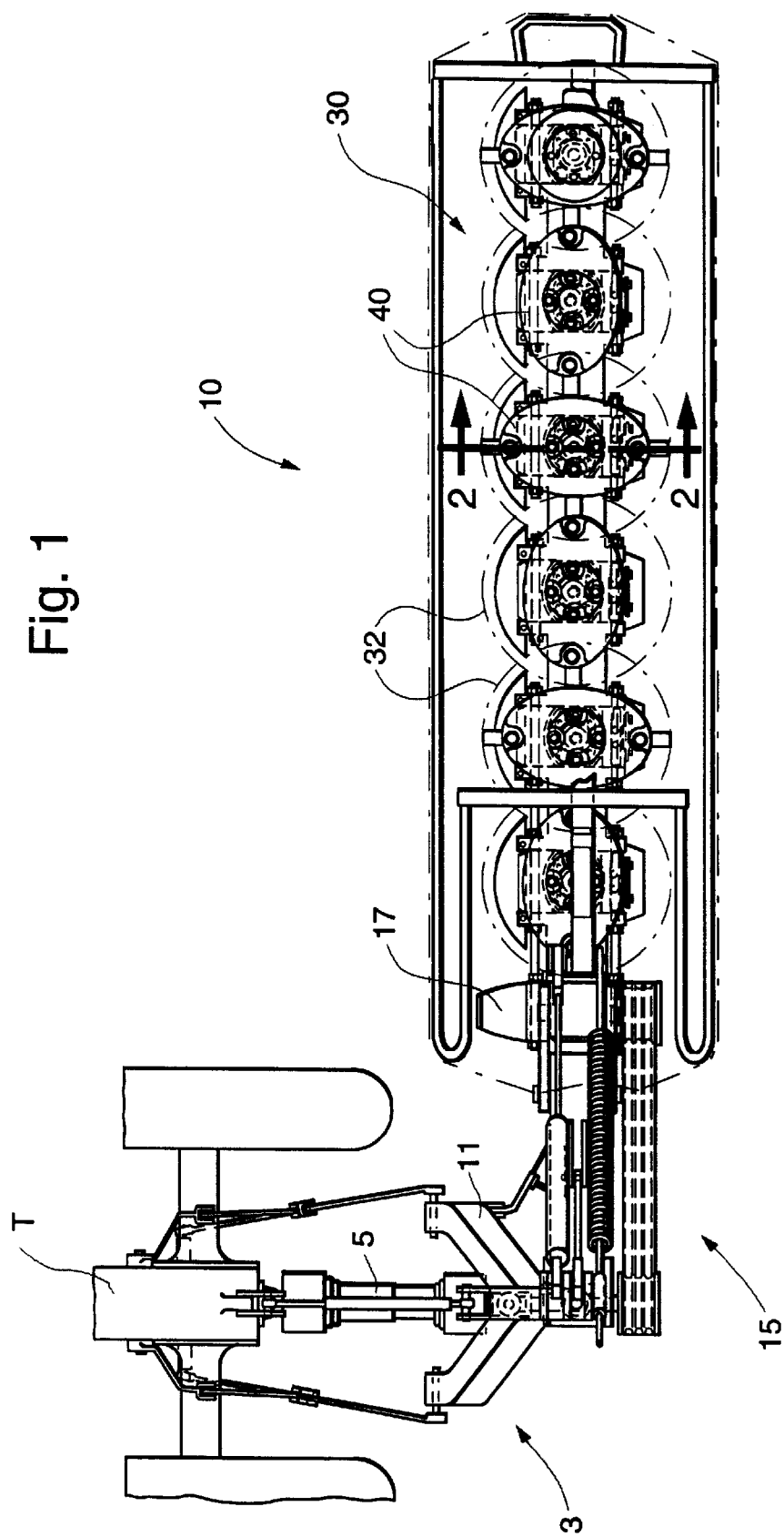
FIG. 1 is a top plan view of a disc mower mounted on the three-point hitch of a tractor, the disc mower having a modular disc cutterbar incorporating the principles of the instant invention, the rotational path of the individual disc members being shown in phantom, the disc mower being one of the configurations in which the improved disc cutterbar of the instant invention can be utilized.

Referring now to the drawings and particularly to FIG. 1, a modular disc cutterbar incorporating the principles of the instant invention can best be seen in a configuration in which the disc cutterbar is conventionally utilized. For a more detailed description of a conventional modular disc cutterbar and various configurations thereof reference is made to U.S. Pat. No. 5,996,323. The disclosure in that patent is hereby incorporated herein in its entirety by reference.

Cutterbar 30 is mounted in a disc mower 10 having a support frame 11 connected to the three-point hitch mechanism 3 of a tractor T on which the mower 10 is carried in a conventional manner. The disc mower 10 receives operative power from the conventional tractor power take-off shaft 5. The mower drive mechanism 15 receives the rotational power from shaft 5 and transfers the rotational power to a gearbox 17, which in turn transfers the rotational power to the cutterbar drive mechanism.

An alternative configuration for the disc cutterbar would be to incorporate the cutterbar in a disc mower-conditioner. This well-known configuration is shown in more detail in U.S. Pat. No. 5,761,890, which is also hereby incorporated herein in its entirety by reference. One skilled in the art and knowledgeable about commercial applications of disc cutterbars will readily recognize that there are other specific configurations of cutterbars to which the invention to be disclosed herein will be applicable. Such skilled individual will also readily recognize that the cutterbar need not necessarily be modular in construction.

Figure 2:
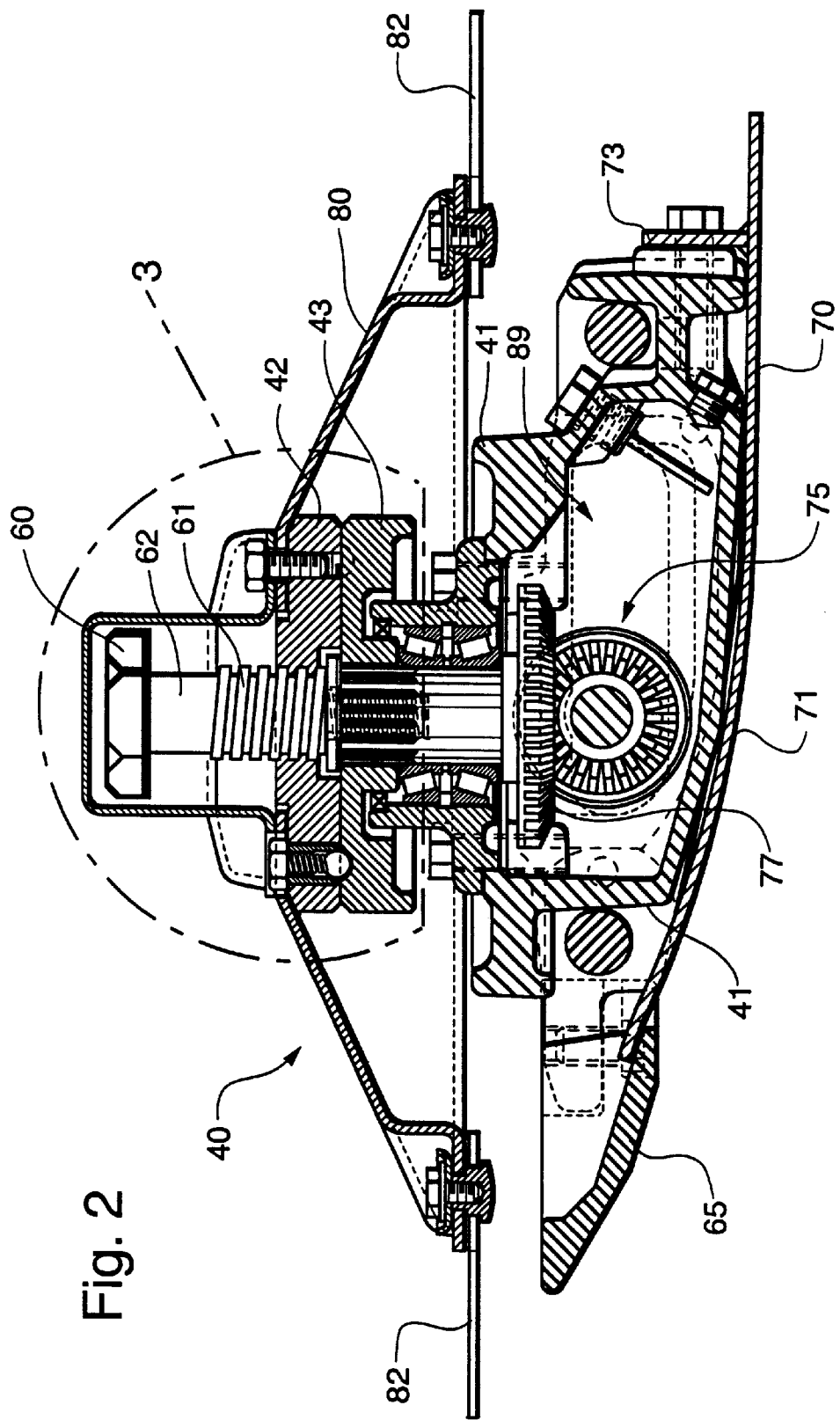
FIG. 2 is a cross-sectional view of the cutterhead module taken along line 2—2 of FIG. 1.

Modular cutterbar 30 is formed from alternating cutterhead modules 40 and spacer modules 32. Each cutterhead module 40, as best seen in FIGS. 1 and 2, includes a hollow cast housing 41 (FIG. 2) having a shape to retain a low profile and to establish an oil reservoir 89 therewithin. As will be discussed in more detail below, the cutterheads 40 are gear driven and assembled in such a manner as to establish a specific timing relationship between adjacent units. More particularly, the cutterheads are arranged such that the knives 82 on adjacent units have overlapping cutting paths, but do not come into contact with each other. Failure to maintain this timed relationship during operation will result in one unit hitting the adjacent unit(s), damaging the cutterheads (and possibly initiating a chain reaction that damages all cutterheads), the drive train of the cutterbar and/or tractor T. In such case, the damage is usually significant.

Referring particularly to FIG. 2, it can be seen that each cutterhead module 40 is provided with a forwardly positioned rock guard 65 and a skid shoe 70 that passes beneath cutterhead module 40 for engagement with the surface of the ground. The rock guard 65 has a conventional semi-circular configuration and is mounted to opposing forward mounting arms of the spacer modules 32 in known manner adjacent to the corresponding cutterhead module 40.

One skid shoe 70 is mounted beneath each cutterhead module 40 to protect the cutterhead module from wear due to engagement with the surface of the ground. Each skid shoe is formed as a generally planar body portion 71 with a mounting tab 73 affixed thereto and projecting upwardly. The body portion 71 is also formed with a forward end that is bent upwardly to engage the corresponding rock guard 65.

Modular drive mechanism 75, best seen in FIG. 2, is fully disclosed in the '323 patent and reference is made thereto for a more complete description.

Broadly, within each cutterhead unit there is a two-piece hub, one upper disc hub and one lower disc hub, normally held together by a shear mechanism. The lower hub is connected to a drive shaft, and the upper hub is connected to a rotatable knife support member and positioned on a specially threaded retaining bolt. At the top of the retaining bolt is an area that remains threadless. When a knife engages a solid or fixed object and a shear force generated adequate to cause the shear mechanism to fail, the upper disc hub rotates upward along the threads of the retaining bolt to the threadless area of the bolt where it is permitted to rotate freely. By thus preventing the knives from rotating further, damage is prevented to the drive train of the cutterbar and between adjacent cutterhead units.

Figure 5:
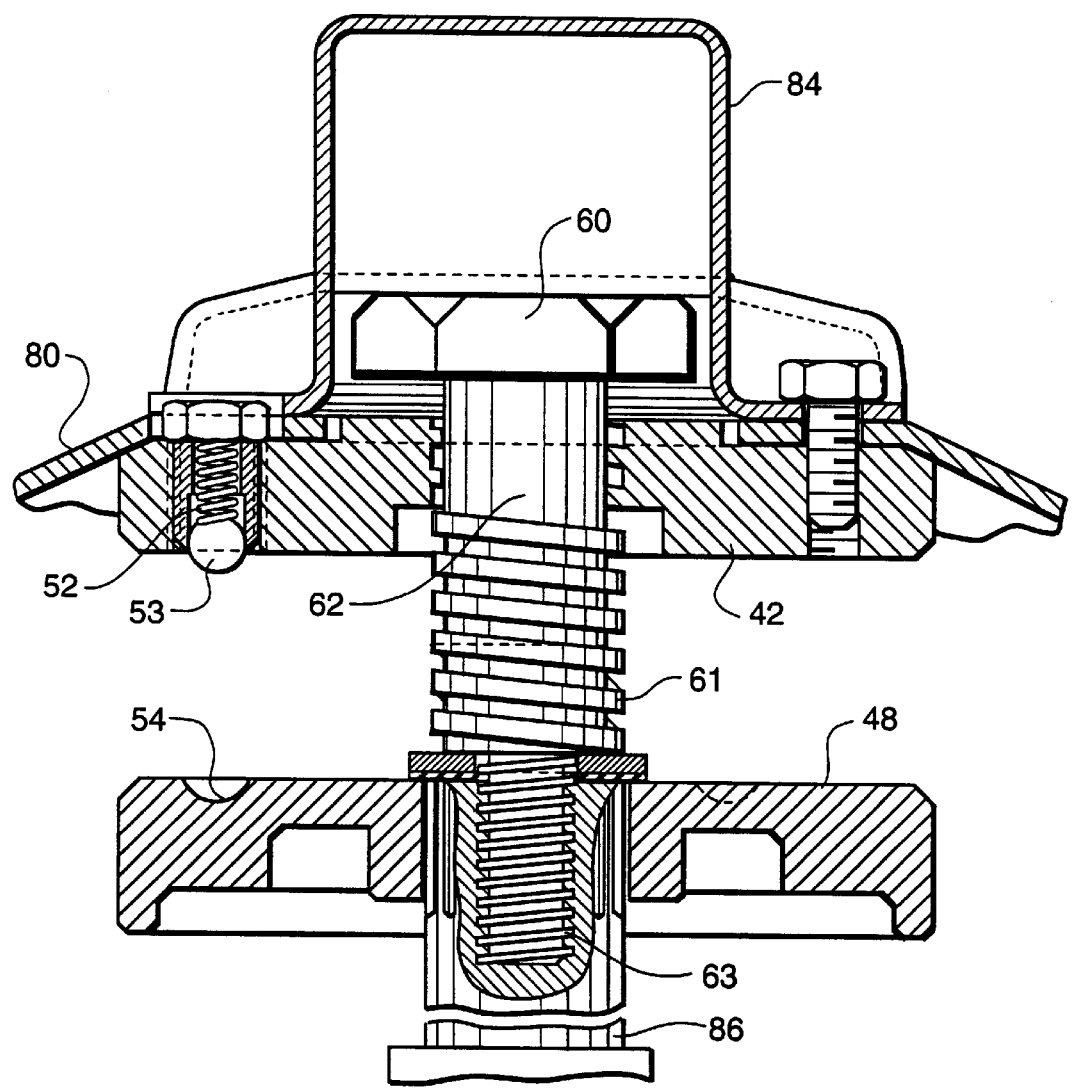
FIG. 5 is a view similar to FIG. 3, showing a cross-sectional view of the cutterhead module taken along line 2—2 of FIG. 1 after the shear mechanism has failed and the upper disc hub 42 and lower disc hub 43 have separated.

Attention is now directed to FIGS. 3–5. In the preferred embodiment, upper disc hub 42 is affixed to lower disc hub 43 by means of multiple spring-mounted balls and detents 50 (only one shown in FIGS. 3 and 5). Bore hole 51 through upper disc hub 42 contains a spring 52 and ball 53. Detent 54 in lower disc hub 43 is aligned with the spring-mounted ball 53 to affix the two hubs. By controlling the compression force of spring 51 on ball 52 (and that of any others used), a specific shear point or force can be calculated so that failure will occur at the desired point and upon a specific impact. After failure of the shear device 50, upper disc hub 42 is free to rotate upward on threads 61 about specially threaded retaining bolt 60 until it reaches the threadless point of the bolt 62. At threadless point 62, the upper disc hub 42 ends its upward rotation, rotates freely, and eventually comes to a stop on its own.

Retaining bolt 60 has a nut at the tope end thereof, a threaded portion 63 at the opposing end thereof for tightening in a centrally threaded bore in driven shaft 86. Driven shaft 86 is splined at 82 and thus affixed to lower disc hub 43. The intermediate portion of retaining bolt 60 is reverse threaded at 61 and to upper disc hub 42. Bolts 81 hold cover 84 and cover, or "turtle", 80 in place on upper disc hub 42, but do not extend into lower hub 43.

A useful characteristic of the shear mechanism of the instant invention is that the ball and detent design allows for shear pin failure without any byproducts that could affect the other operations of the cutterbar. Devices such as that shown in the '662 patent listed above would, upon failure of the shear device, present metallic debris that would likely interfere with, and "jam" up the brake disclosed herein.

As can be seen in FIGS. 2 and 3, upper disc hub 42 is detachably splined onto driven shaft 86. Upper disc hub 42 is affixed to lower disc hub 43 by multiple spring-mounted ball and detent devices that, as described above, serve as a shear device. Turtle 80, and thus knives 82, rotates with lower hub 43. The driven shaft 86 is rotatably supported by a bearing block detachably mounted to the cutterhead module housing 41 by bolts. The bearing block seals an opening in the top of the housing 41 through which the drive gears can be extracted from the oil reservoir 89.

As most clearly seen in FIG. 5, when the cutterhead engages a fixed object of sufficient mass or rigidity to generate a shearing force on the spring-mounted balls and detents 50 adequate to cause failure thereof, the upper and lower disc hubs 42, 43 will separate and upper disc hub 42 will rotate upwardly via threads 36.

As taught in the incorporated patents, the drive mechanism 75 in each cutterhead module 40 is coupled to the other cutterhead module drive assemblies by a transfer shaft that passes through a spacer module. A transfer shaft is splined at each opposing end thereof to be finally received within either of the hubs to transfer rotational power thereto.

Referring again to the configurations of utilization of the cutterbar 30 as depicted in FIG. 1, it can be seen that the drive mechanism 75 in a disc mower 10 receives rotational power from a gearbox 17 that is supported adjacent the inboardmost cutterhead module 40. Accordingly, the drive assembly is connected directly to the output shaft (not shown) of the gearbox 17. The transfer of rotational power to the remaining cutterhead modules 40 proceeds as described above.

As seen in FIG. 4, four shear devices, i.e., balls and detents, are used in the preferred embodiment. Any reasonable number can be used, so long as together the shear forces can be adjusted within useful limits. The shear force may be adjusted or established by the selection of springs, the sizes of the balls, the depth of the detents, and the number and location of shear devices used. The balls and detents are space equally around the rotational axis of the hubs, but this is not necessarily done in all possible embodiments. Additionally, it is possible to use balls and detents of different sizes to establish the required shear force.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A disc cutterbar comprising:

a support member with a cutterhead affixed thereto, said cutterhead having a lower end adjacent the ground when in operation and an opposing upper end;

a power transfer mechanism supported by said support member and including a vertical drive shaft within said cutterhead and adapted to transfer power from a power source into rotational movement in a first direction of said vertical drive shaft, said vertical drive shaft having an upwardly extending distal end;

a lower hub affixed to the distal end of said vertical drive shaft and adapted to be rotated in a generally horizontal plane;

a retaining bolt affixed axially to said vertical drive shaft and extending axially and upwardly away therefrom, said retaining bolt having a threaded portion adjacent the distal end of said vertical drive shaft and an unthreaded portion upwardly therefrom;

an upper hub having a central bore therethrough, said bore being threaded to engage the threaded portion of said retaining bolt, said upper hub including a disc member carrying at least one knife to sever standing crop material, said threaded portion of said retaining bolt and said threaded bore being engaged such that rotation of said upper hub in said first direction forces said upper hub into more intimate contact with said lower hub;

a shear mechanism operable between said upper and lower hubs such that torque is transferred from said drive shaft through said lower hub and shear mechanism to said upper hub and said disc member, whereby when said knife encounters sufficient force to cause said shear mechanism to fail, said second hub moves in a second direction relative to said retaining bolt, opposite said first direction, causing said second hub to move upwardly along the axis of said retaining bolt away from said first hub.

2. The disc cutterbar of claim 1 wherein:

the relative axial length of the unthreaded portion of said retaining bolt and the thickness of said upper hub are such that said second hub can freely rotate on said unthreaded portion when said upper hub has moved sufficiently upwardly along the axis of said retaining bolt away from said lower hub that the threaded bore in said upper hub and the threaded portion of said upper hub are no longer engaged.

3. The disc cutterbar of claim 2 wherein:

said shear mechanism comprises a ball and detent mechanism made up of a detent in the upper surface of said lower hub and bore through said upper hub, said bore containing a mating ball extending partially through the lower surface of said upper hub, said mating ball being spring-biased toward said lower hub and held in place by a threaded cap such that said ball engages said detent with sufficient force from said spring to hold said upper and lower hubs together during normal field operation of the disc cutterbar.

4. The disc cutterbar of claim 3 wherein:

said shear mechanism comprises a plurality of said ball and detent mechanisms equally spaced radially about the bore through said upper hub.

5. The disc cutterbar of claim 4 wherein:

said upper and lower hubs are disc-shaped, and said at least one knife comprises two opposing knives pivotally affixed to said disc member.

6. The disc cutterbar of claim 5 wherein:

the springs in said plurality of ball and detent mechanisms generally all exert the said compression force on the respective balls.

7. The disc cutterbar of claim 5 wherein:

the springs in said plurality of ball and detent mechanisms do not all exert the said compression force on the respective balls.

8. The disc cutterbar of claim 2 further including:

a plurality of cutterheads are affixed to said support member generally in spaced relationship to each other, and said power transfer mechanism transfers power to each said cutterhead.

9. In a disc cutterbar having a support member with a cutterhead affixed thereto, said cutterhead having a lower end adjacent the ground when in operation and an opposing upper end, the improvement comprising:

a power transfer mechanism supported by said support member and including a vertical drive shaft within said cutterhead and adapted to transfer power from a power source into rotational movement in a first direction of said vertical drive shaft, said vertical drive shaft having an upwardly extending distal end;

a lower hub affixed to the distal end of said vertical drive shaft and adapted to be rotated in a generally horizontal plane;

a retaining bolt affixed axially to said vertical drive shaft and extending axially and upwardly away therefrom, said retaining bolt having a threaded portion adjacent the distal end of said vertical drive shaft and an unthreaded portion upwardly therefrom;

an upper hub having a central bore therethrough, said bore being threaded to engage the threaded portion of said retaining bolt, said upper hub including a disc member carrying at least one knife to sever standing crop material, said threaded portion of said retaining bolt and said threaded bore being engaged such that rotation of said upper hub in said first direction forces said upper hub into more intimate contact with said lower hub;

a shear mechanism operable between said upper and lower hubs such that torque is transferred from said drive shaft through said lower hub and shear mechanism to said upper hub and said disc member, whereby when said knife encounters sufficient force to cause said shear mechanism to fail, said second hub moves in a second direction relative to said retaining bolt, opposite said first direction, causing said second hub to move upwardly along the axis of said retaining bolt away from said first hub.

10. The disc cutterbar of claim 9 wherein:

the relative axial length of the unthreaded portion of said retaining bolt and the thickness of said upper hub are such that said second hub can freely rotate on said unthreaded portion when said upper hub has moved sufficiently upwardly along the axis of said retaining bolt away from said lower hub that the threaded bore in said upper hub and the threaded portion of said upper hub are no longer engaged.

11. The disc cutterbar of claim 10 wherein:

said shear mechanism comprises a ball and detent mechanism made up of a detent in the upper surface of said lower hub and bore through said upper hub, said bore containing a mating ball extending partially through the lower surface of said upper hub, said mating ball being spring-biased toward said lower hub and held in place by a threaded cap such that said ball engages said detent with sufficient force from said spring to hold said upper and lower hubs together during normal field operation of the disc cutterbar.

12. The disc cutterbar of claim 11 wherein:

said shear mechanism comprises a plurality of said ball and detent mechanisms equally spaced radially about the bore through said upper hub.

13. The disc cutterbar of claim 12 wherein:

said upper and lower hubs are disc-shaped, and said at least one knife comprises two opposing knives pivotally affixed to said disc member.

14. The disc cutterbar of claim 13 wherein:

the springs in said plurality of ball and detent mechanisms generally all exert the said compression force on the respective balls.

15. The disc cutterbar of claim 13 wherein:

the springs in said plurality of ball and detent mechanisms do not all exert the said compression force on the respective balls.

16. The disc cutterbar of claim 10 further including:

a plurality of cutterheads are affixed to said support member generally in spaced relationship to each other, and said power transfer mechanism transfers power to each said cutterhead.

* * * * *